UNITED STATES PATENT OFFICE.

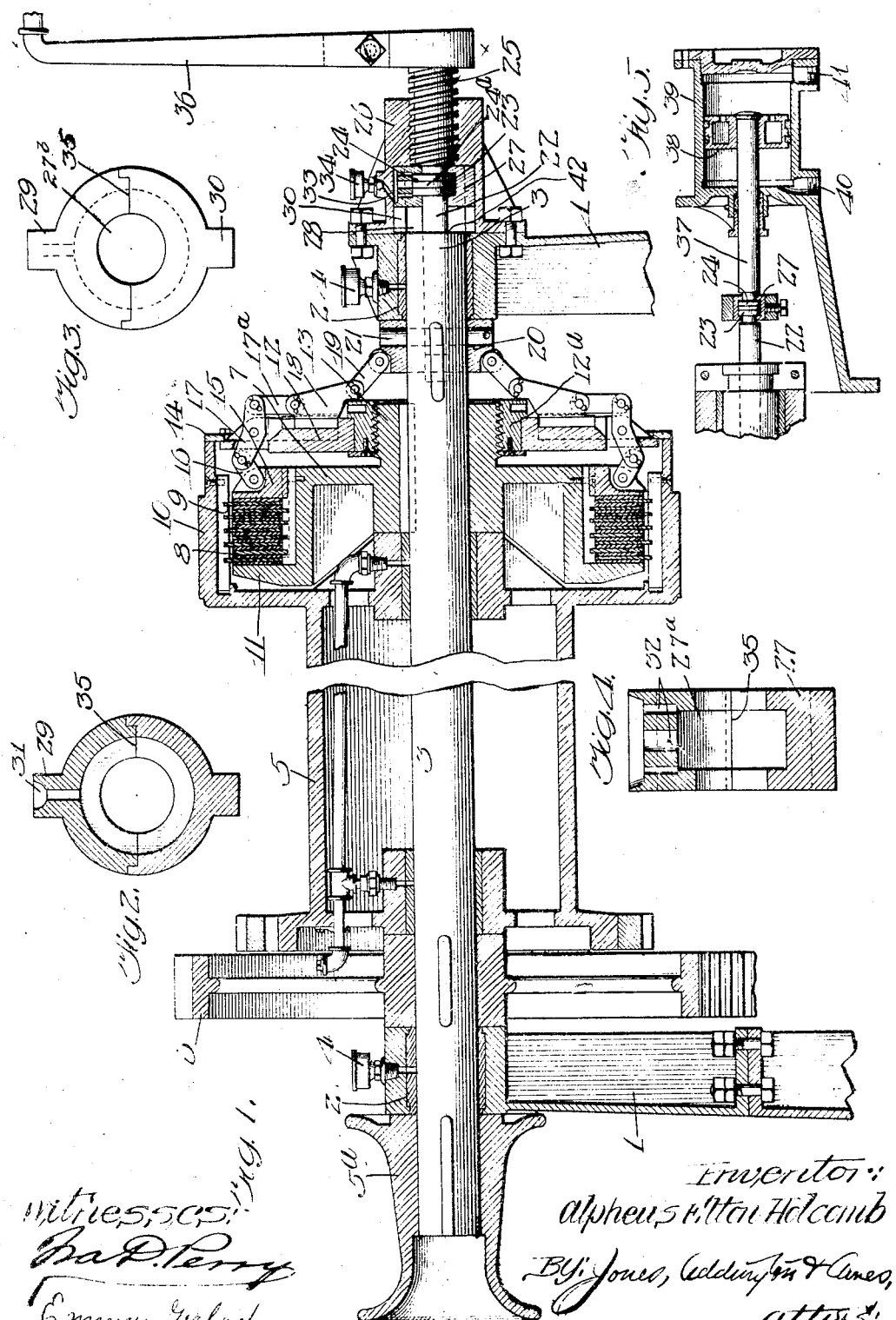

ALPHEUS ELTON HOLCOMB, OF CHICAGO, ILLINOIS, ASSIGNOR OF ONE-HALF TO FRANCIS M. JOHNSON, OF OREGON, ILLINOIS.

CLUTCH AND OPERATING MEANS THEREFOR.

No. 903,858.

Specification of Letters Patent.

Patented Nov. 17, 1908.

Application filed October 22, 1906. Serial No. 339,921.

*To all whom it may concern:*

Be it known that I, ALPHEUS ELTON HOLCOMB, a citizen of the United States, residing at Chicago, in the county of Cook and State of Illinois, have invented new and useful Improvements in Clutches and Operating Means Therefor, of which the following is a full, clear, concise, and exact description, reference being had to the accompanying drawing, forming a part of this specification.

My invention relates to improvements in clutches and operating means therefor, and especially to that class of clutches used in connection with winding drums for connecting the drum to the driving shaft when it is desired to hoist the load.

With certain classes of hoisting drums, it has heretofore, in the commercial art, been the practice to provide a non-self-locking friction clutch for connecting the winding drum with the revolving shaft and to provide for operating the friction clutch, a thrust device which forces the two members of the clutch together, so closely, that the clutch will operate. Certain objections have been presented to such a structure namely, that it requires either additional parts such as a ratchet quadrant and pawl or the constant attention of an operator, in that the handle for operating the thrust device must be constantly held in position to prevent the clutch members from releasing. Also, the end thrust between the thrust pin of the clutch and the thrust device for operating the clutch has been so great that under certain circumstances, when the drum operates at great speed, the two members will become heated and frequently weld together, destroying the machinery and frequently causing loss of life.

One of the objects of my invention is to avoid the above noted objections by providing means whereby the thrust for operating the clutch members is maintained for a limited period only and not during the entire time the clutch is operating. In accomplishing this object, I provide in combination with a thrust device for operating the clutch members, a locking means which maintains the clutches in operative position after the same has been operated by the thrust device.

By my present invention, I am enabled to provide a simple operative mechanism whereby the operator may conveniently operate the thrust device, and at the same time be in a position to control his engine or motor.

I have illustrated in the accompanying drawings, one device for the purpose of disclosing my invention. It will be understood, however, that modifications may be made therein, without departing from the spirit of the invention.

In said drawings: Figure 1 is a sectional view of a hoisting drum and one form of my invention; Figs. 2, 3 and 4 are detail views of the connecting means between the thrust device and the thrust pin; and, Fig. 5 is a view showing a modification of my invention.

Referring to the device illustrated in the accompanying drawing, upon suitable standards or supports 1 are formed bearings 2 in which is arranged to rotate a shaft 3. One end of this shaft has keyed thereto a winch 5ª which may be used for certain work where it is not desired to operate the hoisting drum. The bearings for the shaft 3 are provided with suitable oil cups 4 for lubricating the same, and upon the shaft between the standards 1 is loosely mounted a hoisting drum 5. At one end of the drum between the same and one of the end standards is mounted upon the shaft 3, a driving wheel 6. This wheel in the present instance, takes the form of a gear wheel suitably keyed upon the shaft and arranged to mesh with the pinion of a suitable operating motor by which the shaft 3 is rotated.

The drum 5 has arranged at its opposite end a clutch for connecting the same to the shaft 3. This clutch comprises a hub 7 keyed upon the shaft 3 and having an annular channel formed on the periphery thereof in which are arranged to fit a plurality of rings 8 which are feathered upon the hub 7. Arranged to fit between the rings 8 are a plurality of rings 9 feathered upon an annular flange 10 formed upon the end of the drum 5. The inner end of the hub 7 forms at 11 an abutment against which these rings may be pressed. A head 12 is mounted upon an annular adjusting nut 12ª, which in turn screws upon a projection 13 formed on the hub 7 and serves to inclose the above described portion of the clutch and access is obtained to the interior of the clutch by means of the annular removable ring 14 which fits over the head 12 and is bolted to the annular flange 10. Also mounted upon the hub is an annular movable ring 15 which is considerably thicker in cross section than the rings 8 and 9, and has connected thereto the operating mechanism for squeezing the rings 8 and 9 together. This mechanism consists of suitable sets of links, one set thereof being arranged upon opposite sides of the shaft and connected to a common thrust collar mounted upon the shaft. As both sets of links are alike, I shall, in describing the same, refer to one set only. Pivotally secured to the ring 15 is a short link 16 pivotally connected at its outer end to a bell crank lever 17, which in turn is pivotally connected between projecting flanges to the head 12 and is secured at its outer end by means of a short link 17ᵃ to a sliding link member 18 mounted upon the outer face of the head 12. This sliding link member preferably has a projection which fits in a slot formed in the head 12 whereby the link will slide radially upon said head. The lower end of this sliding link is connected by a short link 19 to a thrust collar 20 suitably feathered upon the shaft 3, and the link 19 is arranged at such an angle that as the thrust collar 20 is moved toward the head 12, the link 19 will cause the link 18 to move radially.

An axial passage 42 is formed in the end of the shaft 3 adjacent to the collar 20, and a transverse slot is formed extending through the shaft 3 and communicating with the passage 42. Reciprocally movable in the passage 42 is a thrust-pin 22 secured to the collar 20 by a cross-head 21, extending through the collar 20 and the inner end of the thrust-pin 22.

The outer end of the thrust pin 22 is provided with a head 23 arranged to be engaged by the head 24 of the threaded screw 25 which operates in a threaded bearing 26 carried upon the standard 1 and forms a thrust device for operating the clutch. The head 23 rotates with the shaft 3 and the head 24 is relatively stationary with respect to the same, as it is only slightly turned for operating the clutch. Secured to the end of the head 24 is a bearing plug 24ᵃ for receiving the wear. It is therefore necessary to provide some means whereby the friction between the two heads is reduced to a minimum, and to this end I provide an oil casing or box 27 which also connects the screw 25 with the thrust pin 22 to cause the pin to follow the screw when it is operated in a reverse direction. This casing or box is arranged to fit within the enlarged bore 28 formed in the inner end of the bearing 26, and is provided with radial lugs 29 which fit in slots 30 formed in the face of the bore 28 to prevent the casing 27 from turning. The casing is provided with a cylindrical chamber 27ᵃ of sufficient size to accommodate the two heads 23 and 24, and with openings 27ᵇ in each side thereof, through which are arranged to project respectively a portion of the thrust pin 22 and a portion of the threaded member 25. The top portion 29 is channeled as at 31 to form an oil receptacle which communicates with the interior chamber 27ᵃ of the casing by means of suitable ports 32. The oil receptacle 31 coincides with a port 33 in the bearing 26 through which oil is supplied to the oil receptacle from an oil box 34 mounted upon the bearing 26. It will be noted that the oil receptacle 31 is of sufficient length to permit a slight movement of the casing 27 without affecting the feeding of the oil thereto from the port 33. The casing 27 is preferably cut transversely at 35 and thereby divided in two sections to permit the insertion of the same in the bore 30 and around the heads 23 and 24.

The threaded member 25 is provided with an operating handle 36 whereby the same may be rotated, and in operation, the handle is rotated in a clock-wise direction to advance the threaded member 25, in its bearing. As the threaded member is advanced in its bearing the head thereof will engage the head 23 of the thrust pin and force the thrust pin forward carrying with it the thrust collar 20. The forward movement of the thrust collar 20, as before explained, causes a radial movement of the sliding link 18, which in turn causes the inner end of the bell crank lever 17 to move inwardly toward the shaft. This in turn causes the link 16 to advance the ring member 15 on the hub, compressing the rings 8 and 9 between it and the abutment 11, whereby the rings will frictionally engage each other and connect the hub 7 with the drum 5 causing the drum to rotate with the shaft 3.

When the outer end of the bell-crank lever 17 has been moved sufficiently to force the inner end thereof past a straight line connecting the central pivoting point of the lever 17 and the point on which the link 16 is connected to the ring 15 the clutch will be locked and the drum will be rotating at full speed, and at the same time all end thrust upon the threaded thrust member 25 may be removed by slightly turning the operating handle 36 in a reverse direction separating the heads 23 and 24 a small fraction of an inch. The internal width of the oil casing 27 is made slightly greater than the combined widths of the members 23, 24 and 24ᵃ, in order to render this separation possible. This separation also serves the purpose of allowing the oil to run in between the heads.

When it is desired to disconnect the drum 5 from the shaft, it is merely necessary to rotate the handle 36 in a counter clock-wise direction which withdraws the thrust pin and thrust collar from the position to which it has been forced reversing the movement of the links and releasing the clutch rings, thereby permitting the shaft and member of the clutch keyed thereto to rotate without affecting the drum 5.

I have illustrated in Fig. 5, a modification of my invention wherein instead of providing the threaded thrust member 25 for forcing the thrust pin forward to cause the clutch to engage, a fluid pressure operated thrust member is provided. In this construction, the head 24 is formed on the end of the piston rod 37 which is connected at its opposite end to a piston 38 operating in a cylinder 39 mounted upon one of the standards 1. Suitable ports 40 and 41 are provided in the cylinder to permit the admission of steam from either side of the piston so that the same may be operated to move the thrust collar 20 forward or backward. I have here mentioned steam as the fluid pressure moving the piston, but it will be understood that any other suitable fluid pressure could be employed.

Having thus described my invention, what I claim as new and desire to secure by Letters Patent, is:

1. In a friction clutch, a member rotatably mounted on the shaft, a second member non-rotatably mounted on the shaft adjacent the first member and having an outwardly extending flange at its rear part, friction disks feathered on the second mentioned member, friction disks feathered on the first mentioned member intermediate the first mentioned friction disks, a ring feathered on the second mentioned member capable of compressing the first and second mentioned disks between itself and the flange of the second mentioned member, and means for effecting the movement of the ring toward the flange on the second mentioned member, said means consisting of a lever moving device and a system of levers, such that when moved to a sufficient extent to effect the compression of the first and second mentioned friction disks between the ring and the flange, the levers become locked and cannot be released until the lever moving device is operated.

2. In a friction clutch, a member rotatably mounted on a shaft, a second member non-rotatably mounted on the shaft adjacent the first member and having an outwardly extending flange at its rear part, friction disks feathered on the second-mentioned member, friction disks feathered on the first-mentioned member intermediate the first-mentioned friction disks, a ring feathered on the second-mentioned member capable of compressing the first and second mentioned disks between itself and the flange of the second-mentioned member, a lever supporting member, having a slideway thereon, rigidly attached to the second-mentioned member, a link pivoted at one end to the ring, a bell-crank lever pivoted to the lever supporting member and connected at one end to the free end of the link, a sliding link member mounted in the slideway of the lever supporting member, a link connecting the other end of the bell-crank lever with the slidable link member, and a lever-moving device connected to the slidable link member.

3. In a friction clutch, a shaft having an axial passage formed in one end thereof and having a transverse aperture formed therethrough communicating with the passage, a member mounted on the shaft, a second member non-rotatably mounted on the shaft adjacent the first member and having an outwardly extending flange at its rear part, friction disks feathered on the second-mentioned member, friction disks feathered on the first-mentioned member intermediate the first-mentioned friction disks, a ring feathered on the second-mentioned member capable of compressing the first and second mentioned disks between itself and the flange of the second-mentioned member, a lever supporting member having a slideway thereon rigidly attached to the second-mentioned member, a link pivoted at one end to the ring, a bell-crank lever pivoted to the lever supporting member and connected at one end to the free end of the link, a sliding link member mounted in the slideway of the lever supporting member, a link connecting the other end of the bell-crank lever with the slidable link member, a thrust-collar feathered on the shaft, a link connecting the thrust-collar with the other end of the slidable link member, a thrust-pin slidably mounted in the axial passage of the shaft, a cross-head extending through the transverse aperture of the shaft and connecting the thrust-collar with the inner end of the thrust-pin, and a screw-threaded member engaging the outer end of the thrust-pin and capable of causing longitudinal movement thereof.

4. The combination with a rotating shaft, of a self-locking clutch mounted thereon, a thrust pin carried by and rotating with said shaft for operating said clutch an end thrust device for operating said pin, an oil casing connecting said end thrust device and said thrust pin, said casing having a limited movement, and means for supplying oil to said casing irrespective of the position assumed in said limited movement.

In witness whereof, I have hereunto subscribed my name in the presence of two witnesses.

ALPHEUS ELTON HOLCOMB.

Witnesses:
M. R. ROCHFORD,
ROBERT LEWIS AMES.